United States Patent [19]

Orvis

[11] 4,004,929
[45] Jan. 25, 1977

[54] COLOR CORRECTED PHOTOGRAPHIC ELEMENTS

[75] Inventor: Roy L. Orvis, Rochester, N.Y.

[73] Assignee: Eastman Kodak Company, Rochester, N.Y.

[22] Filed: Mar. 21, 1975

[21] Appl. No.: 561,019

Related U.S. Application Data

[63] Continuation-in-part of Ser. No. 447,809, March 4, 1974, abandoned.

[52] U.S. Cl. .................. 96/100; 96/9; 96/55; 260/151
[51] Int. Cl.² ............... G03C 1/40; G03C 7/04
[58] Field of Search ................. 96/100, 9, 74

[56] References Cited

UNITED STATES PATENTS

| | | | |
|---|---|---|---|
| 3,408,194 | 10/1968 | Loria | 96/100 |
| 3,476,563 | 11/1969 | Loria | 96/100 |
| 3,644,498 | 2/1972 | Loria | 96/100 |
| 3,839,044 | 10/1974 | Salminen et al. | 96/100 |

Primary Examiner—J. Travis Brown
Attorney, Agent, or Firm—J. G. Levitt

[57] ABSTRACT

Photographic elements containing at least one silver halide emulsion layer in which there is incorporated a cyan-color forming material which, upon reaction with oxidized color developer, forms a cyan dye having unwanted absorption in the green and blue regions of the visible spectrum can be color corrected to a surprising degree by the incorporation into said element of a colored coupler compound having the structure:

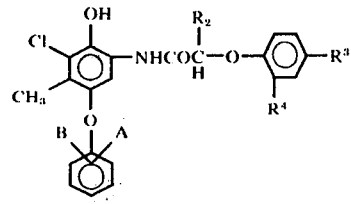

wherein $R^2$ is an alkyl group containing 1 to 6 carbon atoms, $R^3$ and $R^4$ are independently selected and are alkyl groups containing 2 to 6 carbon atoms, B is hydrogen or $CooR^6$ wherein $R^6$ is an alkyl group containing 1 to 8 carbon atoms, and A is a sulfonated naphthylazo group selected from those having the structure:

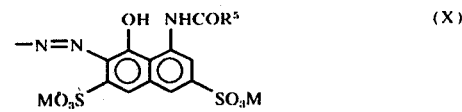

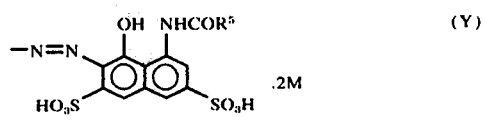

wherein $R^5$ is an alkyl group containing 1 to 4 carbon atoms, M is photographically inactive, M is a monovalent cation.

8 Claims, 5 Drawing Figures

COLOR CORRECTED PHOTOGRAPHIC ELEMENTS

This application is a continuation-in-part of copending U.S. Application Ser. No. 447,809, filed Mar. 4, 1974, now abandoned.

This invention relates to color photography. More specifically, the present invention is directed to color photographic elements which are internally color-corrected by the incorporation thereinto of a colored coupler having the capability of correcting the unwanted green and blue absorption of certain cyan color-forming couplers to a surprising extent.

BACKGROUND OF THE INVENTION

Color-forming coupler compounds which react during photographic development with the development product of aromatic amino developing agents to form color images are well known. Generally, these color-forming compounds are colorless or substantially colorless. This lack of color is usually desirable when the coupler is to be incorporated in the emulsion layer and the unused coupler remains after formation of the colored image.

Figure 1:
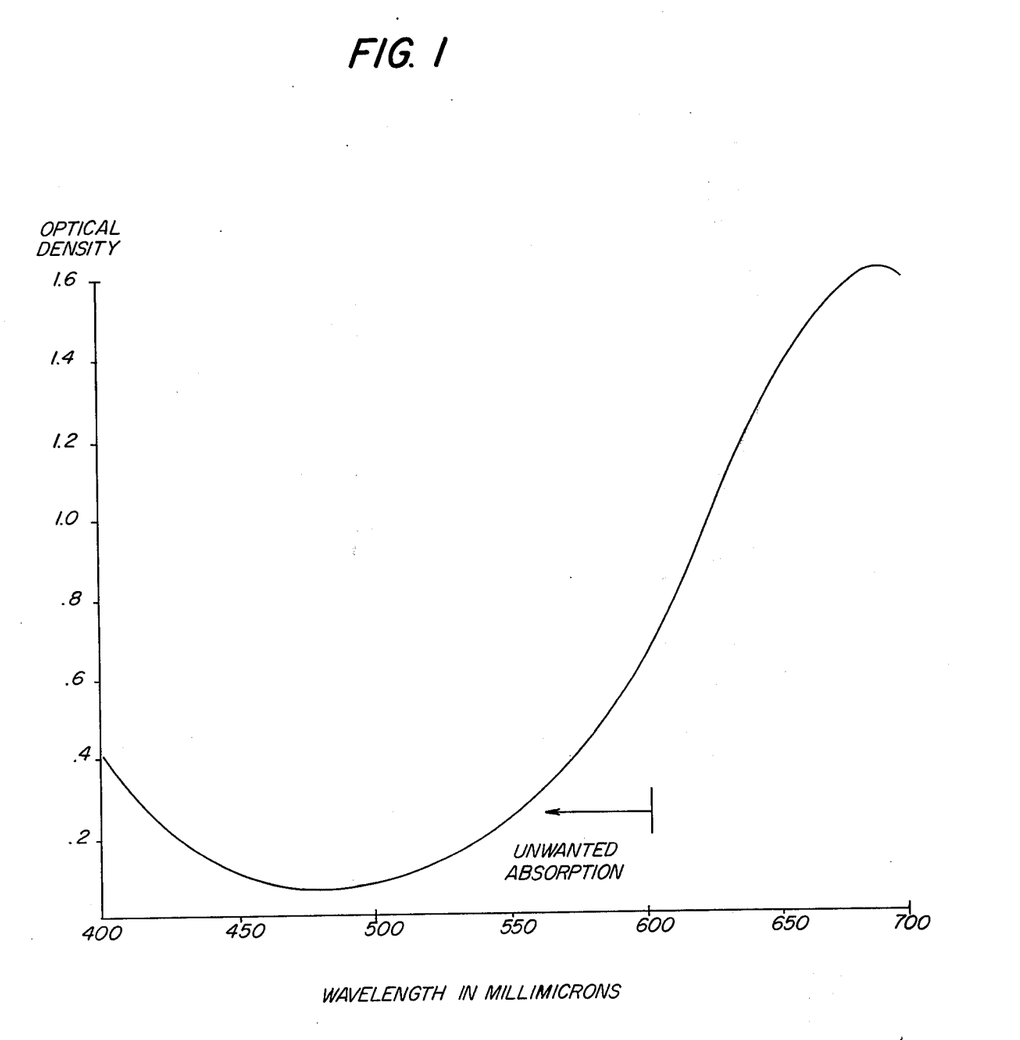

Unfortunately, the absorption spectra of conventional dyes formed from color-forming coupler materials are never "clean". Thus, invariably, cyan dyes exhibit various degrees of unwanted absorption in the green and blue regions of the spectrum, while magenta dyes exhibit unwanted absorption in the blue region and to some degree also in the red region of the spectrum. The term "unwanted absorption" is intended herein to mean, with respect to a cyan dye, measurable absorption in the green and blue regions of the visible spectrum. Unwanted absorption is illustrated in FIG. 1, as that portion of the curve above the base line at wavelengths lower than about 600 millimicrons.

Whereas the human eye and brain have the capability of automatically compensating for a certain amount of such unwanted absorption in positive color photographs and transparencies which contain such conventional dyes, machines and equipment for reproducing photographs and transparencies do not have such compensating capability. Hence, photographic materials which must be mechanically reproduced, for example, from color negatives or positive transparencies, must be color-corrected so as to largely overcome the effects of unwanted absorption. Color correction becomes increasingly necessary when it is desired to reproduce the color element by means of a series of negative-positive-negative-positive steps such as those usually used in the preparation of (from valuable "master" films) motion picture films for release.

One very useful method of compensating for the unwanted absorption caused by a dye derived from a given dye-forming coupler involves the inclusion of a special colored coupler into the photographic element (in addition to the image-forming coupler that is to be "color-corrected"). The colored coupler absorbs both green and blue light, in the case of correcting for unwanted absorption in a cyan dye. This colored coupler theoretically is capable of reacting with oxidized color developer (during the color development processing step) to yield the usable cyan image dye while simultaneously losing its ability, in proportion to development, to absorb in the green and blue regions of the spectrum, thereby "correcting" for the unwanted green and blue absorption of the dye derived from the major cyan dye-forming coupler in the photographic element. (See Chapter 13, "Masking and Coloured Couplers" of R. W. G. Hunt's book, The Reproduction of Colour, pages 233, 263, published by John Wiley & Sons, 1967).

Couplers which are in themselves more or less strongly colored by virtue of containing a chromophore group which is split off or destroyed during and by means of the coupling reaction with the result that the original color of the coupler is destroyed and a new dye is formed upon coupling are disclosed in U.S. Pat. Nos. 2,453,661, Nov. 9, 1948; 2,445,169, Nov. 30, 1948; 2,455,170, Nov. 30, 1948; 2,521,908, Sept. 12, 1950; and 2,706,684, Apr. 19, 1955.

Upon development of an emulsion layer containing one of these colored couplers, the original color of the colored coupler is destroyed and a new color is formed by the coupling reaction at those points where development occurs. There is formed in this way a composite dye image consisting of the new dye and the residual colored coupler. The theory of color correction requires that the sum of the absorption of the residual colored coupler and the undesired absorption of the image dye should be as constant as possible. Conventional color correction to date has resulted either in non-ideal (non-uniform) correction, or uniform correction with somewhat higher Dmin than is desirable. (The higher Dmin apparently results from the necessity to use relatively large amounts of certain color-correcting couplers which have relatively low activity.) Another shortcoming that exists with respect to certain of the conventional color-correcting couplers that otherwise exhibit good correction relates to their color prior to their reaction with oxidized color developer. The peak absorption of such colored couplers was often too hypsochromic, by several wavelengths, and thus yielded corrections which were somewhat less than desirable.

Figure 3:
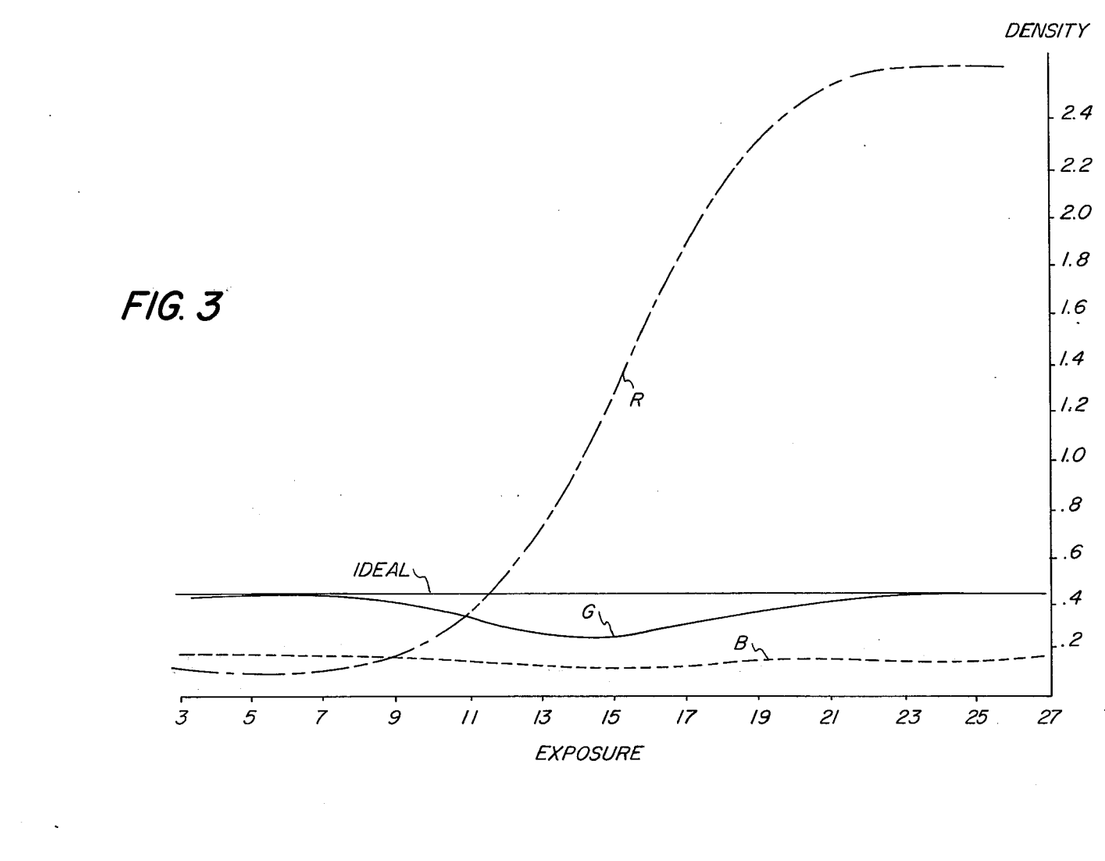
Figure 4:
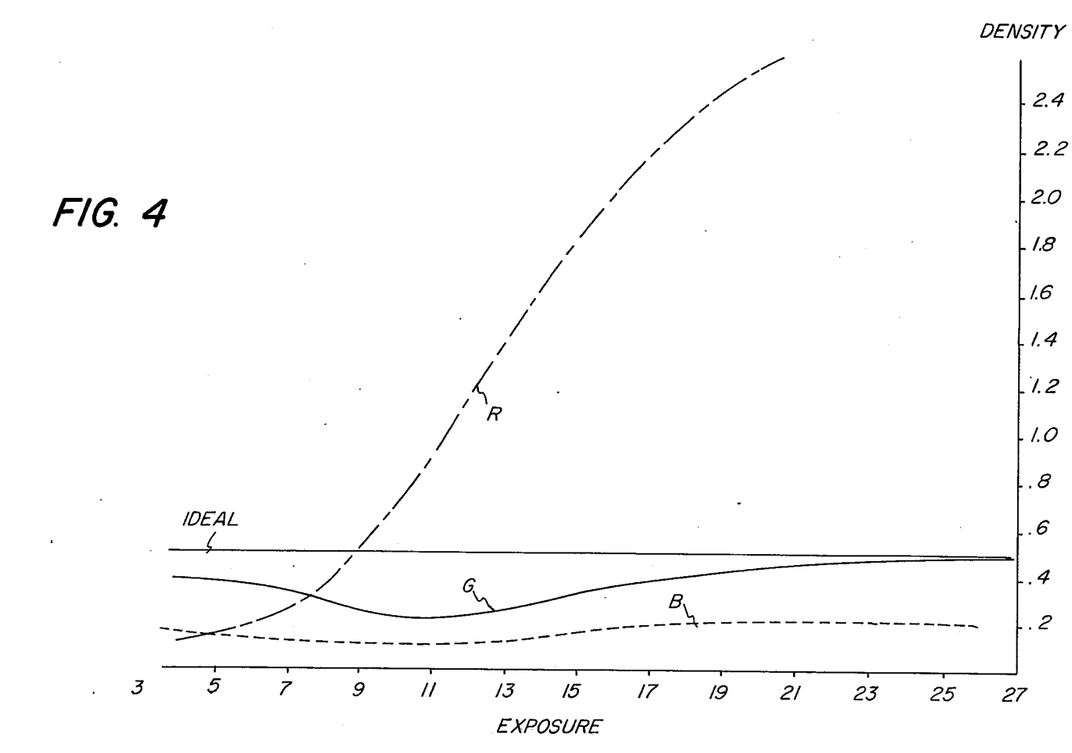

The use of certain prior art color-correcting couplers, such as those described in the Examples, below, yield excellent dyes, but are not capable of yielding "ideal" or "uniform" color-correction,. This fact is illustrated by FIGS. 3 and 4. Note that substantially uniform absorption in the green and blue regions (particularly in the green) is not achieved by the materials used in the preparation of FIGS. 3 and 4. Ideal color correction should result in perfectly level "G" and "B" curves in the Figures, such as those marked "ideal" in FIGS. 3 and 4.

Uniform color-correction throughout the development of the color emulsion has been extremely difficult to achieve because of the apparent requirement of uniformity or similarity in each of the many different chemical and physical parameters involved in the color-correcting process. For example, the reaction rates and relative reactivities of each of the couplers in any "color correction" combination must be matched at every stage of the development step, even though the concentration of developer, pH, concentration of reaction by-products and many other aspects of the chemical color development process not only differ widely from one photo-finisher to another, but also differ widely during any single color development operation.

BRIEF DESCRIPTION OF THE INVENTION

It has now been discovered that certain combinations of (a) colorless naphtholic cyan-producing color couplers with (b) certain naphthylazophenoxy phenolic couplers have the surprising capability, when they are uniformly distributed through at least one emulsion layer of a photographic emulsion, of color-correcting almost perfectly during the entire color development operation.

The naphthylazophenoxy phenolic color couplers to which this invention relates have structures like that of formula "I":

wherein $R^2$ is an alkyl group containing 1 to 6 carbon atoms, $R^3$ and $R^4$ are independently selected and are alkyl groups containing 2 to 6 carbon atoms, B is hydrogen or $COOR^6$ wherein $R^6$ is an alkyl group containing 1 to 8 carbon atoms and A is a sulfonated naphthylazo group selected from those having the structure:

wherein $R^5$ is an alkyl group containing 1 to 4 carbon atoms, M is photographically inactive, M is a monovalent cation.

The naphtholic cyan dye-producing color couplers which function so well in color-corrected combination with the compounds of formula I, above, in photographic color film elements have structures like that of formula "II":

wherein R and $R^1$ are independently selected and are alkyl groups containing 1 to 8 carbon atoms and $n$ is an integer from 1 to 6.

Figure 5:
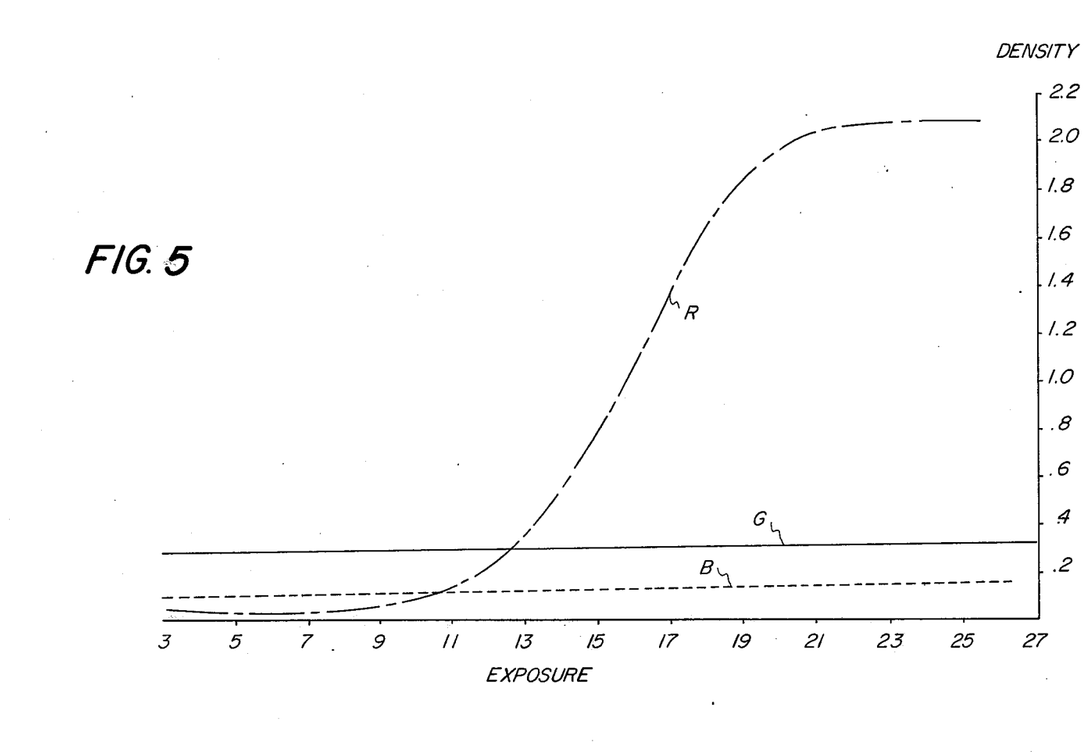

In FIG. 5, the surprising uniformity in cyan color-correction that can result from practicing the present invention is illustrated. Experimental details relating to the acquisition of the data depicted in the FIGS. 2 through 5 are set out in the Examples hereinbelow.

DETAILED DESCRIPTION OF THE INVENTION

Each photographic element of this invention comprises a photographic support upon which has been coated at least one photographic emulsion layer containing, uniformly dispersed therein, photosensitive silver halide and a combination of (a) a naphtholic color coupler compound which, upon reaction with oxidized amino color developer, forms a first cyan dye, plus (b) a naphthylazophenoxy phenolic color-correcting coupler compound which, upon reaction with oxidized amino color developer, splits out the naphthylazophenoxy coupling-off group and forms a second cyan dye, thereby uniformly correcting for the unwanted absorption characteristics of said first cyan dye. The colored compound derived from the naphthylazophenoxy coupling-off group is subsequently washed out of the film element.

The types of coupler materials to which the present invention is directed are set out in formulae I and II, above. In these formulae, R and $R^1$ are preferably the same and contain 4 to 6 carbon atoms. It is also preferred that $R^3$ and $R^4$ be the same and contain 4 to 6 carbon atoms. It is still further preferred that R, $R^1$, $R^3$, $R^4$ are tertiary alkyl groups. $R^2$ and $R^5$ preferably contain 1 to 3 carbon atoms and $n$ is preferably 2 to 4. Preferred alkyl groups for $R^6$ include ethyl, propyl, and butyl. In the overall practice of this invention, the naphthylazophenoxy coupler compounds of formula I can contain any monovalent cation (M in group A), the presence of which does not cause excessive fogging or other deterioration of the desired photographic properties of the element containing them. Thus, useful monovalent cations include the alkali metal cations such as, for example, sodium and potassium, and N-containing cations such as, for example, ammonium, methylammonium, ethylammonium, diethylammonium, triethylammonium, ethanolammonium, diethanolammonium, and the like, as well as species that can be derived by neutralizing sulfonic acid groups (on structure A) with cyclic amines such as, for example, pyridine, piperidine, aniline, toluidine, p-nitroaniline, anisidine, and the like. Of these, because of their solubility properties in the sulfonated phenylazo salt form of the colored coupler, it is preferred that M be tertiary amino, and still further preferred to be cyclic, such as for example, that derived from pyridine.

Preferred colored naphthylazophenoxy phenolic couplers of the present invention include the following:

a. 2-Chloro-6-[α-(2,4-di-t-pentylphenoxy)-butyramido]-4-[2-(8-acetamido-3,6-disulfo-1-hydroxy-2-naphthylazo)-4-(n-carbobutoxy)-phenoxy]-3-methylphenol dipyridine salt b. 2-Chloro-6-[α-(2,4-di-t-pentylphenoxy) butyramdio]-4-[4-(8-acetamido-3,6-disulfo-1-hydroxy-2-naphthlazo phenoxy]-3-methylphenol dipyridine salt c. 2-Chloro-6-[α-(2,4-di-t:pentylphenoxy) butyramido]-4-[2-(8-acetamido-3,6-disulfo-1-hydroxy-2-naphthylazo) phenoxy]-3-methylphenol dipyridine salt d. 2-Chloro-6-[α-(2,4-di-t-pentylphenoxy)-butyramido]-4-[2-(8-acetamido-3,6-disulfo-1-hydroxy-2-naphthylazo-4-carbomethoxy)phenoxy]-2-methylphenol dipyridine salt.

Preferred naphtholic colorless coupler materials of this invention (which form cyan dye upon reaction with oxidized color developer) include the following:

a. 1-Hydroxy-2-[β-(2,4-di-t-pentylphenoxy)ethyl]-naphthamide
b. 1-Hydroxy-2[Δ-(2,4-di-t-pentylphenoxy)-n-butyl]-naphthamide The particular levels of usage of the color-correction coupler combination of the present invention will vary substantially, depending upon the particular density of cyan color and the particular hue desired in the developed color element. For example, in one preferred aspect of the practice of this invention, the ratio of colorless cyan-producing naphtholic coupler (Formula II material) to colored naphthylazophenoxy phenolic coupler (Formula I material) in the photographic elements of the invention should be from about 2.5 to 1 to about 3.5 to 1, and ideally about 3 to 1, respectively. Preferred usage also includes using "Formula I" material at a level of from about 175 to about 810 mg per square meter of coated photographic element, although more or less than this amount can often be used satisfactorily.

In addition, although any particular procedure can be used for incorporating the respective coupler materials described into a photographic silver halide emulsion layer, generally, it is preferred that such coupler materials be used in association with (preferably dissolved in) one or more high boiling coupler solvents. In a further preferred embodiment, each coupler (of the color-correction coupler combination) should preferably be separately dissolved into a coupler solvent and then each solution should preferably be introduced into a fluid photographic emulsion. Techniques for preparing photographic silver halide emulsions containing couplers and high boiling coupler solvents are well known in the art and need not be detailed herein. See, for example, Product Licensing Index, December, 1971, page 110. If desired, other coupler materials such as, for example, development inhibitor releasing couplers described in U.S. Pat. No. 3,227,554, in addition to the color-correction coupler combinations discussed herein, can also be present in the cyan-forming emulsion layer(s) of the present emulsions. For multicolor photographic elements, of course, other couplers will be present in other emulsion layers in our elements. It has been observed that manufacturing procedures and chemical development methods affect the degree of color-correction effectiveness of the photographic elements of this invention to some extent; however, excellent color correction can be obtained in the generic practice of this invention by simply following the details and teachings set out above in combination with known prior art manufacturing methods. Much has been published concerning the manufacture of "color" photographic elements, including multi-layer elements. See, for example, the several procedures referred to in Section XVIII on page 109 of Product Licensing Index, December, 1971. The successful practice of this invention does not depend upon any particular manipulative procedure being used in the manufacture of the photographic elements described above; nor in the use of any particular type of manufacturing equipment, so long as the essential features regarding the constitution of the color-correction coupler combination in the silver halide layer(s) of the present photographic elements, as set out hereinbefore, are observed.

The photographic elements of the present invention can also contain any desired emulsion addenda that do not interfere excessively with the desired photographic and color-correcting properties of such elements. Examples of such addenda and methods for their use are set out at pages 107 through 110 of Product Licensing Index, December, 1971. Similarly, chemical processing of photographic elements is described in Section XXIII, page 110 of Product Licensing Index, December 1971. Chemical "processing" which involves the reaction of oxidized organic amino color developer materials with color coupler materials, as described in said Section XXIII, can be used in the practice of this invention, although the use of p-phenylenediamino materials such as N,N-diethylamino-p-phenylamine, 4-amino-3-methyl-N-ethyl-N-β-(methanesulfonamido)ethylaniline and the like is preferred.

Methods are known for manufacturing the coupler materials used in the color-correction coupler combination of the present invention. For example, the naphthylazo phenolic coupler materials of Formula I, above, can be manufactured by a multi-step procedure such as that illustrated below:

Manufacture of Naphthylazo Phenolic Coupler Materials

Step 1

4-chloro-3-nitro-n-butylbenzoate

Procedure

A 3 liter, 3-necked flask was charged with 600 g (2.98 moles) of 4-chloro-3-nitrobenzoic acid, 840 ml of thionyl chloride and 12 ml of dimethylformamide. The flask was equipped with a stirrer and a condenser with a drying tube, and the mixture was refluxed on a steambath overnight.

The thionyl chloride was removed under reduced pressure, leaving a yellow crystalline solid. One liter of n-butanol was added slowly with stirring, keeping the temperature at 25° C with an ice bath. The mixture was stirred overnight at room temperature.

The crystalline solid was removed by filtration, air dried, and recrystallized from 2500 ml of methanol. All crops were combined to yield 314 g (24.5%) of white crystalline solid, having a thin layer chromatogram of one spot on silica (benzene).

Step 2

4-Fluoro-3-nitro-n-butylbenzoate

Procedure

A 5 liter, 3-necked flask was charged with 314 g (1.22 mole) of 4-chloro-32400 ml of dimethylformamide and 168 g of anhydrous potassium fluoride.

The mixture was refluxed for 4 hours on a heating mantle and concentrated to a volume of 500 ml under reduced pressure. Upon addition of 1500 ml of benzene, a white solid appeared and was removed by filtration. The filter cake was washed with benzene and the filtrate was concentrated to an oil under reduced pressure. The oil was distilled for purification and the purity established by thin layer chromatography, yielding 202 g (68.7%) of yellow liquid.

temperature less than 15° C. Solution occurred near the end of the addition.

The reaction was allowed to come to room temperature over a 2-hour period and then poured out into a large volume of ice-water with good stirring to precipitate the orange/brown product.

Upon recrystallization from methanol with seeding, a yellow solid was collected and air dried to yield 398 g (59%) with a m.p. of 70° – 72° C. Thin layer chromatography on silica gel (benzene) gave a single spot.

Step 4
2-[α-2,4-di-t-pentylphenoxy)butyramido]-6-chloro-5-methyl hydroquinone

Step 3
2-[α-2,4-di-t-pentylphenoxy)butyramido/]-6-chloro-5-methyl benzoquinone

Procedure

A solution of 65 g (0.137 mole) of 2-[α-(2,4-di-t-pentylphenoxy)butyramido]-6-chloro-5-methylben-

Procedure

A solution of 704 g (1.42 moles) of 2-[α-2,4-di-t-pentylphenoxy)butyramido]-4,6-dichloro-5-methylphenol in 6000 ml of acetic acid at 100° C in a 12 liter 3-necked flask was prepared by stirring while the flask is held in an electric mantle. The amber solution was cooled with external water to 15° C at which time 111 g (1.61 moles) of sodium nitrite dissolved in 600 ml of water was added over a ½ hour period keeping the zoquinone dissolved in 250 ml of tetrahydrofuran was reduced using palladium on charcoal catalyst in a shaker under 40 P.S.I. of hydrogen. The reduction was complete after absorbing the theoretical (0.137 mole) amount of hydrogen at room temperature. The product was removed from the catalyst by filtration and was used in its tetrahydrofuran liquors in the blocking reaction with α-bromotoluene.

Step 5

3-[α-(2,4-di-t-pentylphenoxy)-butyramido]-5-chloro-6-methyl-4-benzyloxyphenol

Procedure

Two of the 65 g reduction tetrahydrofuran filtrates prepared by the procedure described in Step 4 were combined (0.274 moles) and added to 3500 ml of sieve dried acetone containing 90 g of potassium carbonate in a 5 liter flask equipped with a stirrer, condenser and nitrogen bleedline.

47 g (0.272 mole) of α-bromotoluene was added and the reaction refluxed for 24 hours on a steam pot and under a nitrogen blanket.

The reactant was poured out into 10 liters of cold water containing 50 ml of concentrated hydrochloric acid. The tan gum quickly solidified and was slurried in hot hexane.

There were obtained 130 g (83% yield) of a light tan solid, m.p. of 183° – 187° C and having a single spot on thin layer chromatography using a silica gel slide and eluting with benzene containing 5 volume percent of ethyl acetate.

Step 6

5-benzoyloxy-2-(4-carbobutoxy-2-nitrophenoxy)-6-chloro-4-[α-(2,4-di-t-pentylphenoxy)butyramido]-toluene

Procedure

A 12 liter, 3-necked flask was charged with 384 g (0.678 mole) of 3-[α-(2,4-di-t-pentylphenoxy)-butyramido]-5-chloro-6-methyl-4-benzyloxyphenol prepared by the procedure of step 5, 3.5 liters of DMF, and 164 g (0.678 mole) of 4-fluoro-3-nitro-n-butylbenzoate prepared by the procedure described in Step 2.

Under a blanket of nitrogen the mixture was stirred and cooled to 10° C. A solution of 29.8 g of sodium hydroxide (0.746 mole) in about 150 ml of water was added dropwise, keeping the mixture cold. When addition was complete, the mixture was stirred at room temperature for 30 min.

The mixture was poured into 25 liters of ice-water to which 350 ml of hydrochloric acid had been added. The solid was removed by filtration, washed well with cold water, and air dried yielding 533 g (99.8%) of yellow solid having a thin layer chromatograph (T.L.C.) at one spot.

Step 7

4-(2-Amino-4-carbobutoxyphenoxy)-6-chloro-2-[α(2,4-di-t-pentylphenoxy)butyramido]-5-methylphenol

Procedure

A 1500 ml stainless steel pressure bottle was charged with 533 g (0.678 mole) of 5-benzoyloxy-2-(4-carbobutoxy-2-nitrophenoxy)-6-chloro-4-[α-(2,4-di-t-pentylphenoxy)butyramido]-toluene, prepared by the procedure described in Step 6 and enough tetrahydrofuran to fill the container. Under a blanket of nitrogen 2 spoonfuls of 10% palladium on charcoal catalyst were added. The mixture was placed on the Parr apparatus under 40 psi of hydrogen pressure.

When the reduction was completed, the catalyst was removed by filtration and the solution was concentrated to an oil under reduced pressure and used directly in the next step.

Step 8

2-Chloro-6-[α-(2,4-di-t-pentylphenoxy)butyramido]-4-[2-(8-acetamido-3,6-disulfo-1-hydroxy-2-naphthylazo)-4-(n-carbobutoxy)phenoxy]-3-methylphenol dipyridine salt to stand undisturbed for 24 hours and the supernatant fluid decanted off. The magenta sediment was collected by filtration and dried in a warm air oven for 2 days.

The resulting 529 g of dark magenta solid was recrystallized from 5 liters of dry acetone, yielding 350 g.

Another of the preferred naphthylazo phenolic couplers useful in the practice of this invention was synthesized by a similar procedure wherein Steps 1 and 2 were omitted, and in Step No. 6 the 4-fluoro-3-nitro-n-butylbenzoate was replaced with 1-fluoro-4-nitrobenzene:

Procedure

A 5 liter, 3-necked flask was charged with 453 g (0.678 mole) of 4(2-amino-4-carbobutoxyphenoxy)-6-chloro-2-[α-(2,4-di-t-pentylphenoxy)butyramdio]-5-methyl phenol, prepared by the procedure described in Step 7 and 2.2 liters of glacial acetic acid. To this mixture 635 ml of concentrated hydrochloric acid was added dropwise. The solution was chilled to 10° C. A solution of 51.5 g (0.746 mole) of sodium nitrite in 200 ml of water was added dropwise.

The above mixture was poured slowly into a 3-necked, 12 liter flask containing a chilled solution of 260 g (0.678 mole) of 8-acetamido-3,6-disulfonaphthol (disodium salt) in 4.2 liter of methanol. A solution of 2 liters of pyridine in 2 liters of methanol was trickled into the cold mixture. When addition was completed, the reaction mixture was stirred for 30 min. at room temperature and concentrated to a volume of 6 liters under reduced pressure.

The oily mixture was poured into 30 liters of ice-water with vigorous stirring. The mixture was allowed

Manufacture of Naphtholic Coupler Materials

The naphtholic coupler materials useful in the practice of this invention can be manufactured by the general process illustrated in U.S. Pat. No. 3,476,563, by selecting the appropriate raw materials for such process.

Examples of Practicing This Invention

A. Control No. 1 — No Color Correction

Onto one surface of a conventional transparent subbed poly(ethylene terephthalate) photographic film support was coated conventionally (from a 3% gel) a photographic emulsion which, after drying, yielded a coating containing the following components:

| | |
|---|---|
| Silver chlorobromide (as Ag) | 972 mg/m² |
| Gelatin | 2376 mg/m² |
| Coupler (naphtholic)* | 551 mg/m² |
| Coupler solvent** | 275 mg/m² |

*1-hydroxy-2[Δ-(2,4-di-t-pentylphenoxy)-n-butyl]-naphthamide
**Tricresyl phosphate, - coupler dissolved in coupler sovlent before dispersion into emulsion

The silver halide in the emulsion was spectrally sensitized conventionally to red light. The resulting film element was exposed through a graduated-density test object and then color processed conventionally in the following sequence:
1. Color develop*
2. Stop
3. Bleach
4. Fix
5. Stabilize
6. Dry

Figure 2:
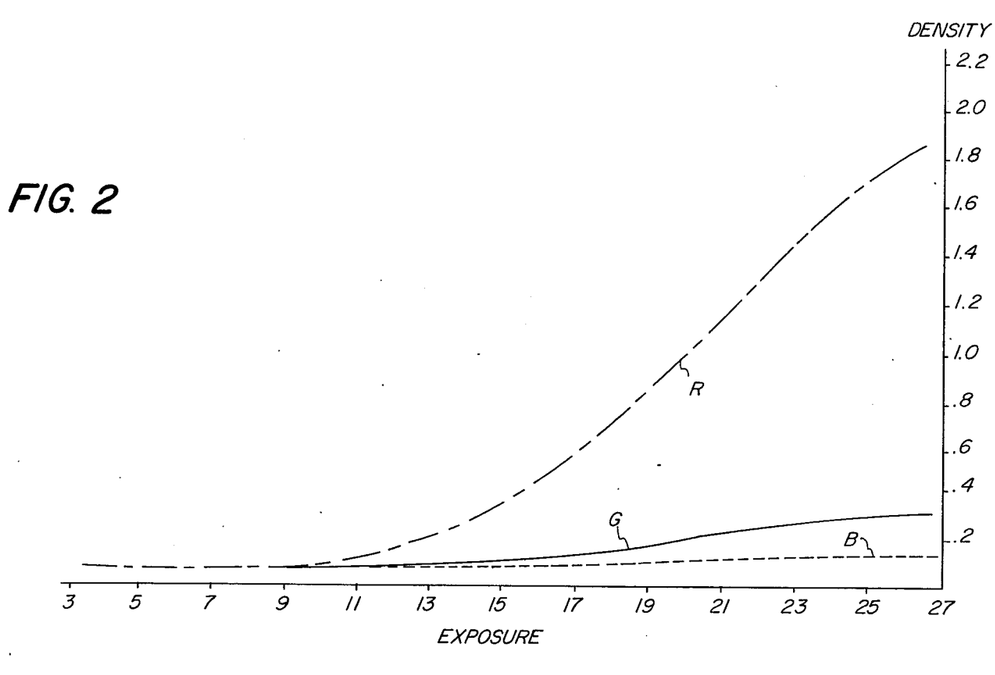

* Using as color developing agent 4-amino-3-methyl-N-β-(methanesulfonamido)ethylaniline After color processing, the characteristic curves for red, green and blue light absorption were obtained conventionally, and are set out herein as FIG. 2. Note that the curves labeled G and B in FIG. 2 represent unwanted absorption, as hereinabove described.

B. Control No. 2 — Color Correction by Prior Art Coupler

A photographic film element was prepared like that of Control No. 1, above, with the exception that there were used 2268 mg gelatin/m² and 216 mg/m² of a conventional color-correcting coupler having the structure:

in addition to the cyan image dye-forming coupler.
Also, the coupler solvent was dibutyl phthalate for Control No. 2. (See 2,322,027). Color processing and treatment otherwise of this element was the same as for Control No. 1, above. The resulting characteristic curves for red, green and blue light absorption by the processed element are illustrated in FIG. 3. Similar results (see FIG. 4) were obtained when the colored coupler of this "control" was replaced by an appropriate amount (about 97 mg/m²) of the conventional colored coupler 1-hydroxy-4-[4-(8-acetamido-3,6-disulfo-1-hydroxy-2-naphthylazophenoxy]-2-[Δ-(2,4-di-t-pentylphenoxy)-n-butyl]naphthamide dipyridine salt.

D. Examples

A photographic film element was prepared like that of Control No. 1, above, with the exception that 367 mg/m² of tricresyl phosphate was used as coupler solvent. Also, dispersion of the coupler solvent was aided by use of a small amount of an auxiliary solvent composed of 2 parts by weight propyl acetate and 1 part methyl alcohol. In addition, the colored coupler used in this example was 178 mg/m² of:

Color processing and treatment otherwise of this element was the same as for Control No. 1, above. The resulting characteristics curves for red, green and blue light absorption by the processed element are illustrated in FIG. 5. The surprisingly close approach to ideal color correction which is possible in the practice of this invention can immediately be appreciated by comparing FIG. 5 with FIGS. 3 and 4.

Results like those of FIG. 5 were obtained when 187 mg/m² of the colored coupler:

was used in place of the colored naphthylazo phenolic coupler material of the first example.

When film materials such as those described in this Example were used as color intermediate film for producing motion pictures for distribution from a valuable color original via the usual procedure involving the use of films containing color-correcting coupler during at least two intermediate steps in the copying procedure, films color-corrected according to the present invention yielded excellent copies without the necessity for extensive equipment adjustment at each step, etc., that is ordinarily needed when conventional color-correcting couplers are used. Also, film materials of this invention make possible product film copies having surprisingly low Dmin values.

The invention has been described in detail with particular reference to preferred embodiments thereof, but it will be understood that variations and modifications can be effected within the spirit and scope of the invention.

What is claimed is:

1. In a photographic element comprising a support and at least one silver halide emulsion layer coated on said support and containing, incorporated in said layer (a) at least one naphtholic coupler capable of forming a cyan dye upon reaction with oxidized aromatic amino color developing agent, and (b) at least one colored coupler compound capable of forming a cyan dye upon reaction with said color developing agent;

the improvement wherein said naphtholic coupler has the structure:

wherein R and $R^1$ are independently selected and are alkyl groups containing 1 to 8 carbon atoms and $n$ is an integer from 1 to 6; and said colored coupler compound has the structure wherein $R^2$ is an alkyl group containing 1 to 6 carbon atoms, $R^3$ and $R^4$ are independently selected and are alkyl groups containing 2 to 6 carbon atoms, B is hydrogen or $COOR^6$ wherein $R^6$ is alkyl containing 1 to 8 carbon atoms and A is a sulfonated naphthylazo group selected from those having the structure:

(T)

or

(V)

wherein $R^5$ is an alkyl group containing 1 to 4 carbon atoms, M is a photographically inactive monovalent cation.

2. An improved photographic element as in claim 1 wherein said naphtholic coupler is 1-hydroxy-2-[α(2,4-di-t-pentylphenoxy)-n-butyl]-naphthamide, $R^2$ is ethyl, $R^3$ and $R^4$ are pentyl, $R^5$ is methyl, $R^6$ is butyl, and A has the structure V.

3. An improved photographic element as in claim 2 wherein M is pyridine and A is a para or ortho substituent on the phenoxy group.

4. An improved photographic element as in claim 1, wherein said colored coupler compound has the structure:

5. In a photographic element comprising a support and at least one silver halide emulsion layer coated on said support and containing, incorporated therein, (a) at least one naphtholic coupler capable of forming a cyan dye upon reaction with oxidized aromatic amino color development agent, and (b) at least one colored coupler compound capable of forming a cyan dye upon reaction with said color developing agent;

the improvement wherein said naphtholic coupler has the structure:

and said colored coupler compound has the structure:

wherein $M_1$ is tertiary amine.

6. An improved photographic element as in claim 5 wherein said $M_1$ is pyridine.

7. In a photographic element comprising a support and at least one silver halide emulsion layer containing, incorporated in said layer, at least one naphtholic coupler capable of forming a cyan dye upon reaction with oxidized aromatic color developing agent; said dye having unwanted absorption in the green and blue regions of the spectrum; and at least one green- and blue-absorbing color coupler compound capable of forming a cyan dye and simultaneously losing a part of its capability to absorb green and blue light upon reaction with said color-developing agent;

the improvement wherein said green- and blue-absorbing color coupler is

8. In a photographic element comprising a support and at least one silver halide emulsion layer containing, incorporated in said layer, at least one naphtholic coupler capable of forming a cyan dye upon reaction with oxidized aromatic color developing agent; said dye having unwanted absorption in the green and blue regions of the spectrum; and at least one green- and blue-absorbing color coupler compound capable of forming a cyan dye and simultaneously losing a large part of its capability to absorb green and blue light upon reaction with said color-developing agent; the improvement wherein said green- and blue-absorbing color coupler is

* * * * *